United States Patent [19]
Berg

[11] Patent Number: 5,872,911
[45] Date of Patent: Feb. 16, 1999

[54] METHOD AND SYSTEM OF SERVICE IMPACT ANALYSIS IN A COMMUNICATIONS NETWORK

[75] Inventor: Myron Berg, Colorado Springs, Colo.

[73] Assignee: MCI Communications Corporations, Washington, D.C.

[21] Appl. No.: 581,748

[22] Filed: Dec. 29, 1995

[51] Int. Cl.$^6$ ................................................ G06F 11/34
[52] U.S. Cl. ................................. 395/183.19; 379/111
[58] Field of Search ..................... 395/183.19, 185.01, 395/183.01, 187.01, 182.16, 181, 183.03, 183.13, 182.02; 371/2.1, 20.1, 68.1; 379/269, 265, 266, 111–113; 370/242, 252

[56] References Cited

U.S. PATENT DOCUMENTS

| | | | |
|---|---|---|---|
| 5,251,152 | 10/1993 | Notess | 364/550 |
| 5,261,044 | 11/1993 | Dev et al. | 395/159 |
| 5,337,320 | 8/1994 | Kung | 371/15.1 |
| 5,436,909 | 7/1995 | Dev et al. | 371/20.1 |
| 5,437,009 | 7/1995 | Lane | 395/161 |
| 5,483,590 | 1/1996 | Chiu et al. | 379/269 |
| 5,488,715 | 1/1996 | Wainwright | 395/182.02 |
| 5,528,748 | 6/1996 | Wallace | 395/183.01 |
| 5,551,025 | 8/1996 | O'Reilly et al. | 395/600 |

FOREIGN PATENT DOCUMENTS

95/32411  11/1995  WIPO .

OTHER PUBLICATIONS

Bertoli et al., "ITT 1240 Digital Exchange Operations and Maintenance," *Electrical Communication*, vol. 56, No. 2/3, 1981, pp. 184–197.

*Primary Examiner*—Robert W. Beausoliel, Jr.
*Assistant Examiner*—Nadeem Iqbal

[57] ABSTRACT

A system and method for using service impact analysis (SIA) to provide a telecommunications network carrier with improved real-time information on network failures. The system monitors a network for faults by collecting fault data. The system assess the fault data to determine the actual service impact at a particular instant in time and the likely cause of the fault. The system also predicts future service impact based on collected historical data of the telecommunications network. The system thus associates equipment failures with actual and potential call traffic impact to provide both customer and network support operations with additional perspective on the service impact of a network equipment failure. This customer oriented view, rather that the traditional network oriented view, is significant in providing imported telecommunications service availability with limited human resources.

15 Claims, 8 Drawing Sheets

METHOD AND SYSTEM OF SERVICE IMPACT ANALYSIS IN A COMMUNICATIONS NETWORK

BACKGROUND OF THE INVENTION

1. Field of the Invention

The present invention relates generally to wireless cellular network systems. More particularly, the present invention relates to assessing network service impact from a customer perspective rather than the traditional network perspective and indicating results of the assessment as part of an alarm notification.

2. Related Art

Traditionally, telecommunications network operators use extensive network management systems to collect, process, and display equipment alarm data for network management engineers. Equipment alarm data normally indicates an equipment malfunction. An equipment malfunction is also referred to as a fault. For example, network equipment may be designed to indicate when a card, circuit, or chassis has failed. Even in relatively simple networks, equipment alarms can generate a large quantity of complex, often interrelated, data. The data must be processed to prevent significant customer service discontinuities.

To help organize the volume and complexity of the incoming network fault data, network operators use sophisticated analysis engines or knowledge-based systems to convert the raw alarm data into usable, real-time information. In spite of this processing, however, network management users must have significant experience and insight into the network to understand the significance of alarm data and identify the criticality of a failure. Thus, what is required is a system to simplify the task of assessing the incoming network fault data.

SUMMARY OF THE INVENTION

The present invention is a system and method for using a concept referred to as service impact analysis (SIA) to provide a telecommunications network provider with improved real-time information about network failures. SIA is a method for associating network failures with the telecommunications services impacted by those failures. By associating the equipment failure with actual and potential call traffic impact, a system designed according to the present invention provides both customer and network support operations with additional perspective on the service impact of a network equipment failure. This customer oriented view, rather that the traditional network oriented view, is significant in providing improved telecommunications service availability with limited human network resources.

One embodiment of the present invention is a method for analyzing a service impact of a fault in a telecommunications network, such as a wireless network. The wireless network contains network equipment that is capable of remotely indicating its status. The method first collects fault data from the network equipment. Such fault data is typically in the form of equipment alarms. The equipment alarms indicate equipment status. After the fault data is collected, the method filters the failure data to reduce the volume of fault data. The method then correlates the fault data to determine a particular fault associated with the fault data. The method then displays fault data and service impact data textually and/or pictorially.

To analyze the data, the present invention requires historical data about the network. According to the present invention, the historical data is obtained by a rolling period during which the historical data is collected and compiled. The actual fault data is compared to the historical data to develop the service impact analysis.

A system and method designed according to the disclosure contained herein provides several advantages over existing network management systems. First, a system designed according to a preferred embodiment of the present invention provides an improved service perspective. This is because the present invention views service from a service delivery perspective rather than a network availability perspective. Second, a system designed according to a preferred embodiment of the present invention provides improved restoral prioritization. That is, the present invention provides a network operator with an indication of which faults are most likely to impact service. Thus, a network operator can prioritize the fixing of faults in the network to improve service. Third, the present invention provides a display of often cryptic alarm data in a form that is easily understandable by customer and network support users.

In sum, Service Impact analysis is intended to provide network operators with real time analysis data for improved telecommunications network operations. The approach generates data for a customer-service rather than network-oriented view of the network, and provides a "look ahead" view of expected network outage consequences.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for using service impact analysis (SIA) to provide a telecommunications network carrier with improved real-time information on network failures. The system monitors a network for faults by collecting fault data. The system assesses the fault data to determine the actual service impact at a particular instant in time and the likely cause of the fault.

The system also predicts future service impact based on collected historical data of the telecommunications network. The system thus associates equipment failures with actual and potential call traffic impact to provide both customer and network support operations with additional perspective on the service impact of a network equipment failure. This customer oriented view, rather than the traditional network oriented view, is significant in providing improved telecommunications service availability with limited human resources.

Figure 1:
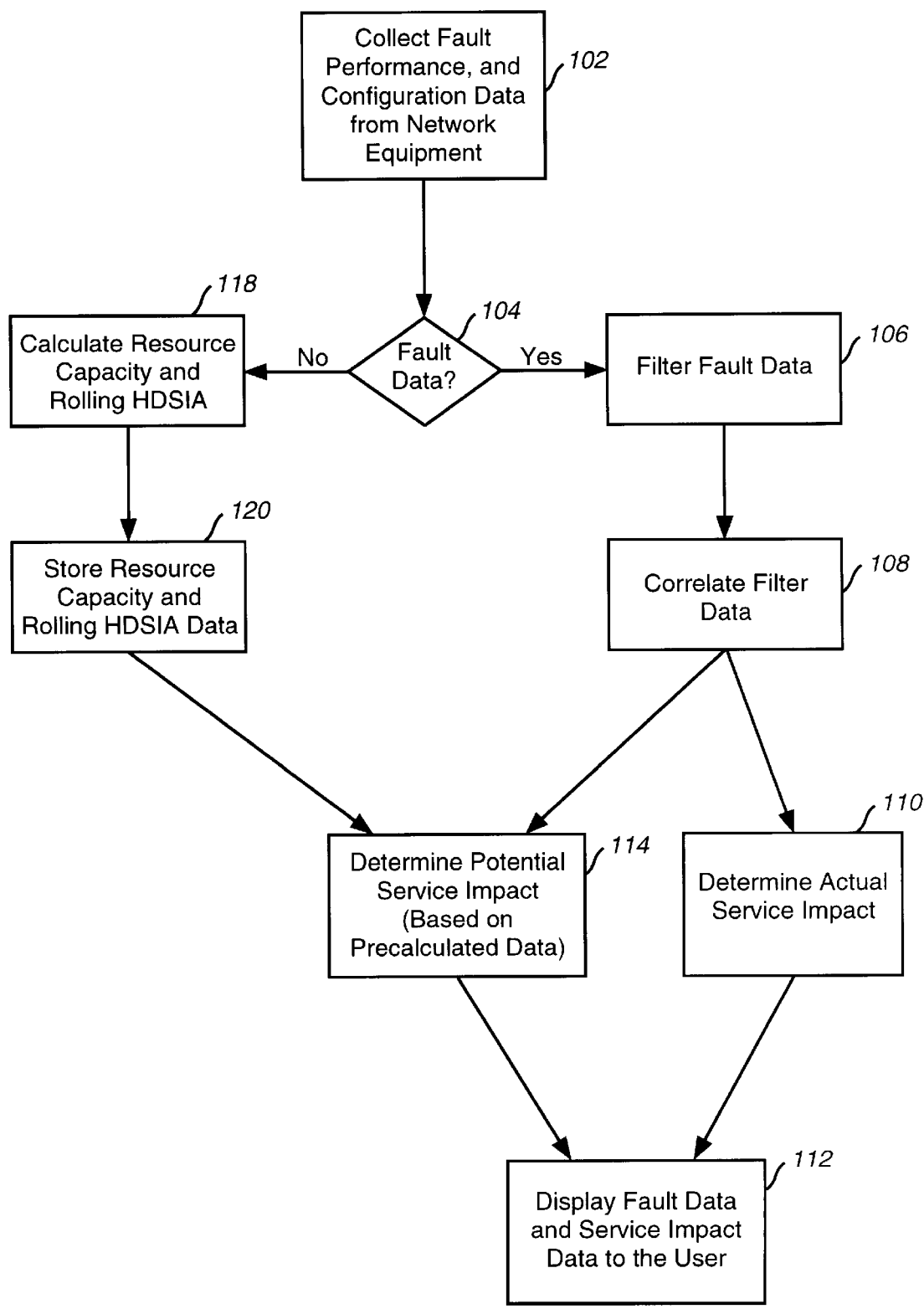
FIG. 1 is a flowchart for carrying out a preferred embodiment of the present invention.

FIG. 1 illustrates a flowchart of a method for performing service impact analysis for a telecommunications network according to a preferred embodiment of the present invention. The method comprises steps 102–120. Steps 102–112 can occur in substantially real time.

The method begins in step 102. In step 102, the method collects data. The data can be fault, configuration, and/or performance data. Fault data normally indicates the status of equipment comprising the telecommunications network. For example, fault data can be in the form of alarm data. Alarm data indicates the presence of an equipment failure. Configuration data refers to both network configuration and equipment configuration data. Equipment configuration data includes model number, version, equipment settings, and equipment capacity. Network configuration data includes the logical and physical configuration of equipment on a network, as well as communication paths between cells in a network. Performance data includes data such as call traffic volume through a particular piece of equipment or section of a network.

After collecting the data, the method moves to decision point 104. In decision point 104, the method determines whether the collected data is fault data. If the collected data is fault data, the method continues in step 106. If the collected data is not fault data, i.e., it is performance or configuration data, the method continues in step 118.

In step 106, the method filters the collected fault data. Filtering, in the context of the present invention, corresponds to data reduction. Filtering is required due to the high volume of fault data that can be generated by even a simple telecommunications network. Typically, a single fault can generate 1–100 or more alarms. These alarms are captured in step 102. To increase the efficiency of the present invention, the method reduces the volume of the fault data by filtering in step 106. It would be apparent to any person skilled in the art that filtering step 106 can be omitted at the expense of requiring greater storage and processing capacity to handle the large volume of fault data.

As described above, filtering step 106 reduces the volume of fault data. In the preferred embodiment of the present invention, several methods of filtering can be employed. Each method filters the fault data on the basis of a different criterion.

A first method of filtering filters the data by type of equipment. Thus, alarm data corresponding to only a particular type of equipment is retained for subsequent processing. Alternatively, the filter may pass all fault data except the data associated with a particular type of equipment.

A second method for filtering is by the severity level of the alarm. In the preferred embodiment of the present invention, there are three alarm severity levels: minor, major, and critical. The severity levels are associated with the imminence and/or magnitude of service impact. For example, a minor severity level indicates a condition that does not result in immediate loss of service. A critical alarm, on the other hand, can result in immediate loss of service to a large number of customers. It would be apparent to one skilled in the art that other severity levels, corresponding to other conditions, are possible. In step 106, filtering can pass only alarms that are one of, or a combination of, the severity levels. For example, the filtering step may pass only critical alarms for subsequent processing. Alternatively, the method can pass major and critical alarms, i.e., not minor alarms. It would be apparent to one skilled in the art that other combinations of severity levels are possible.

A third criterion for filtering is by priority level. That is priority levels can be assigned to different pieces of equipment. In this case, alarms associated with equipments having a priority below, equal to, or above a selected priority level are passed by the filtering step 106 for subsequent processing.

The aforementioned filtering techniques can be combined. For example, filtering can be performed based on the type of equipment and severity level. The filtering techniques are merely provided for examples of how to reduce the high volume of fault data. It would be apparent to one skilled in the art that there are other ways to reduce data volume through filtering, any of which can be incorporated into filtering step 106.

After filtering the fault data in step 106, the method correlates the filtered fault data in step 108. Correlating is a further data reduction technique based on a higher level analysis than performed in filtering step 106. That is, correlating step 108 applies "intelligence" to determine relationships between alarms. The relationships provide an indication as to why a particular alarm occurred. The knowledge gleaned from the correlating step 108 can be used to build a knowledge data base containing learned relationships between alarms and faults.

For example, suppose a telecommunication network includes equipments A and B having equal alarm priorities. Further assume that an alarm in equipment A triggers 10 alarms in equipment B, even though equipment B has not failed. In this case, filtering step 106 would pass all 11 alarms. This is because equipments A and B have the same priority level. Furthermore, a user would not know that only the alarm triggered by equipment A required fixing. However, knowing that the occurrence of a fault in equipment A triggers 10 alarms in equipment B, allows the method to ignore the 10 alarms caused by equipment B. This analysis is performed in correlating step 108. As seen in this example, correlating step 108 results in a further reduction of the fault data.

As described above, correlating step 108 further reduces the volume of fault data. In the preferred embodiment of the present invention, several methods of correlating can be employed. Each method correlates the fault data on the basis of a different criterion.

A first method of correlating the filtered data correlates using a rules-based engine. That is, correlation is performed in accordance with a set of logical rules that determine relationships between the fault data. For example, a set of alarms may be related to a single fault that occurs in a particular type or group of equipment comprising the telecommunications network. As such a logical rule can be developed that on the occurrence of such a set of alarms, the method indicates the particular fault associated with the set of alarms. Thus, a user is presented with an indication of the fault giving rise to the set of alarms. Because the method informs the user of the fault, rather than the set of alarms giving rise to the fault, the user is spared from having to analyze the mass of information contained in the set of alarms.

A second technique correlates alarms that occur in a particular sequence over time. That is a particular fault can generate a particular sequence of alarms. Such information can be part of the knowledge base, such that on detecting the particular sequence of alarms, the method provides an indication of the fault to the user. Once again, the user is spared from having to analyze the voluminous alarm data.

A third technique for correlating is to hardcode the relationships in software. That is, where the relationship between a fault and a set of alarms is known a priori, the relationship can be hardcoded into software. No "learning" is required for such relationships.

The aforementioned correlating techniques can be combined. For example the rules based correlation technique can be combined with hardcoding relationships in software. The aforementioned correlating techniques are merely provided for examples of how to further reduce the volume of fault data. It would be apparent to one skilled in the art that there are other ways to further reduce data volume, any of which can be incorporated into correlating step 108.

After correlating the fault data, the method progresses to step 110. In step 110, the method uses the results of correlating step 108 to determine actual service impact on the telecommunications network. In step 110, the method analyzes the reduced volume fault data (fault data after filtering and correlation) to determine the immediate impact on the network. This determination is made using information on the topology and the fault. For example, the method can determine whether and what traffic is dropped as a result of the fault.

Figure 1A:
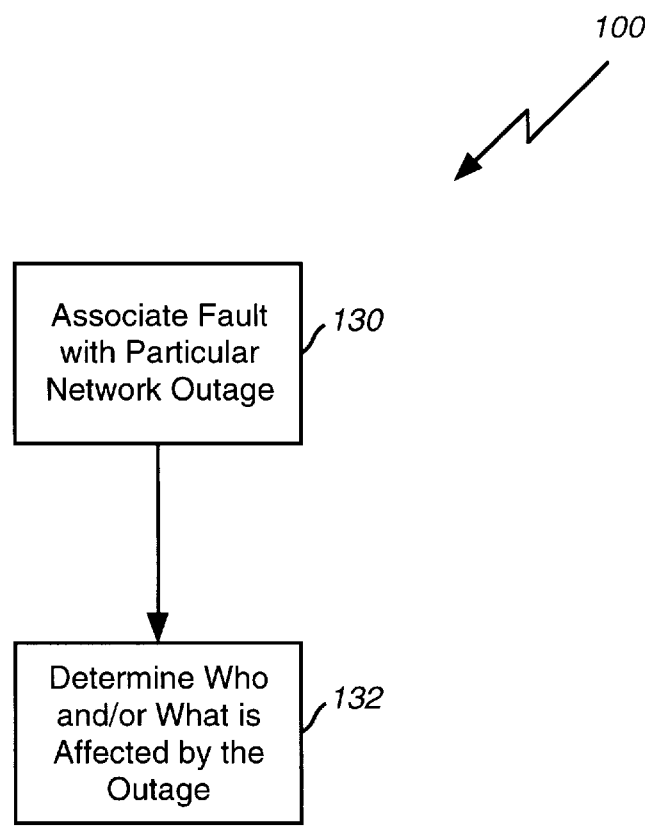
FIG. 1A is a flowchart describing determining step 110 according to a preferred embodiment of the present invention.

FIG. 1A describes determining step 110 in more detail. In step 130, the method associates a fault with a particular network outage. That is, the occurrence of a fault may result in a portion of the network being unavailable to service call traffic, i.e., a network outage. Step 130 determines whether there is such an outage, and further, what that outage is. After determining the network outage caused by a particular fault, the method advances to step 132. In step 132, the method determines which customers or what equipment is affected by the network outage determined in step 130. This is accomplished using conventional mechanisms which track network traffic.

Thus, the present invention determines what fault caused the fault data received in step 102. The effect of this fault can be assessed by considering the fault's effect on network topology and existing service. Using a conventional traffic tracking mechanism, the effect of the fault on existing traffic can be determined. An example of determining actual service impact is illustrated below with reference to FIG. 3.

After determining the actual service impact in step 110, the method moves to step 112. In step 112, the method displays the fault data and the service impact to the analysis to a user.

Figure 3:
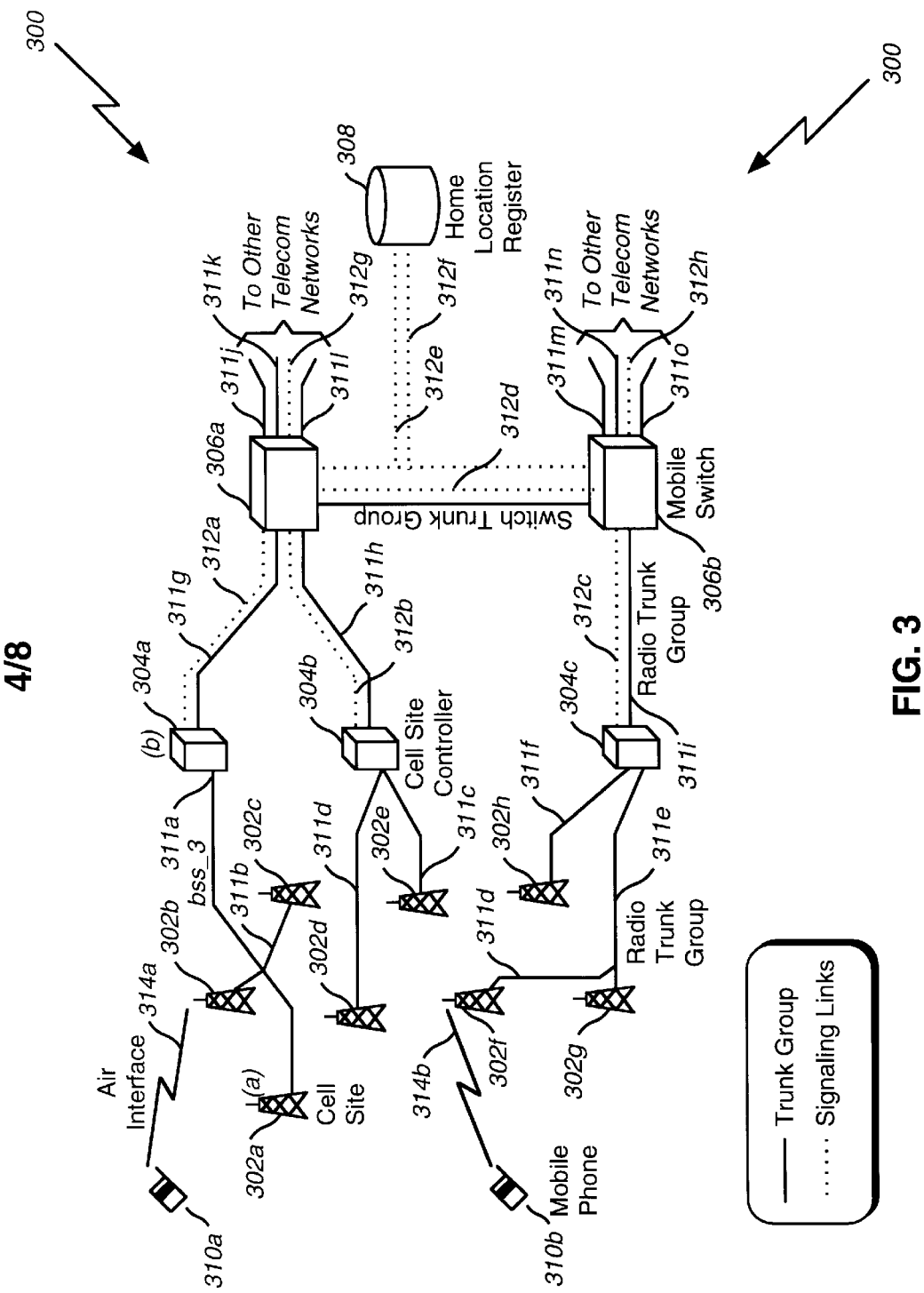
FIG. 3 is a wireless telecommunication network 200.
Figure 4A:
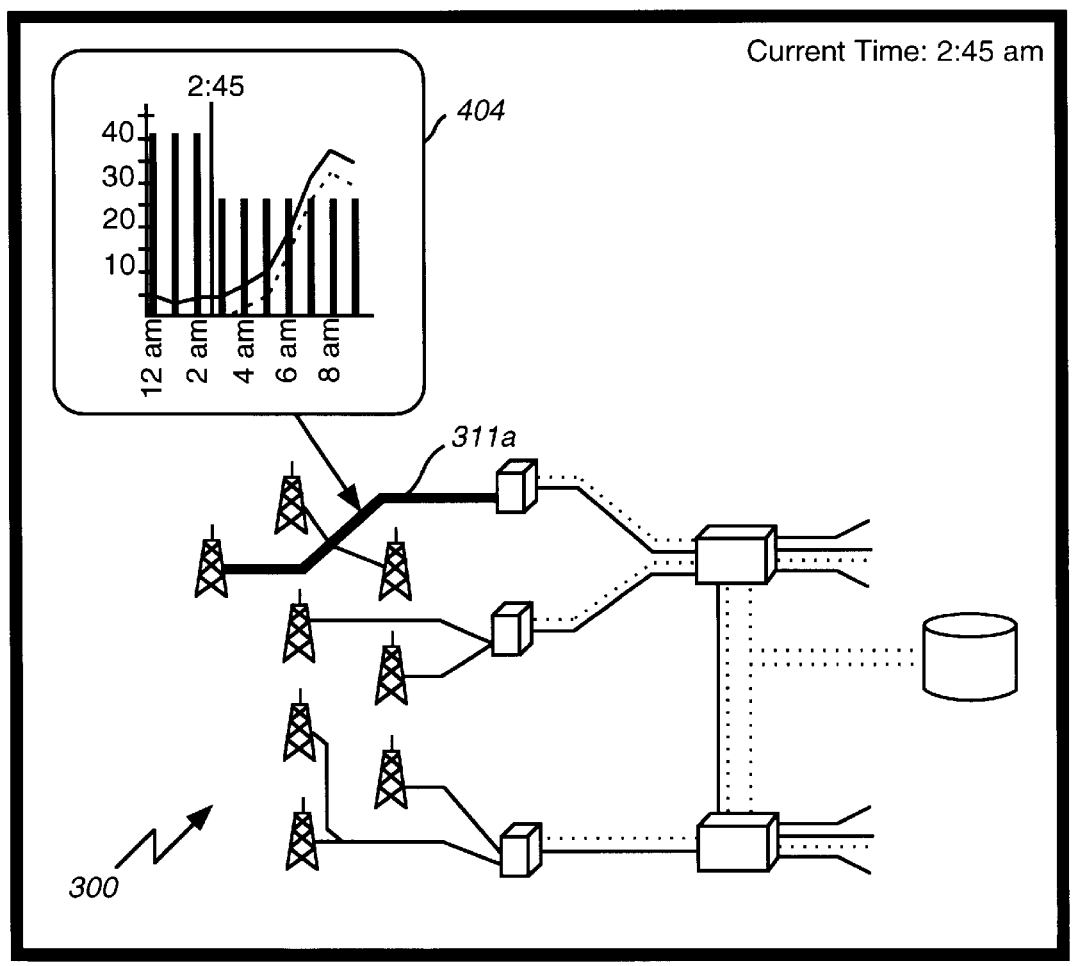
FIG. 4A and 4B are example displays of data processed according to a preferred embodiment of the present invention.
Figure 4B:
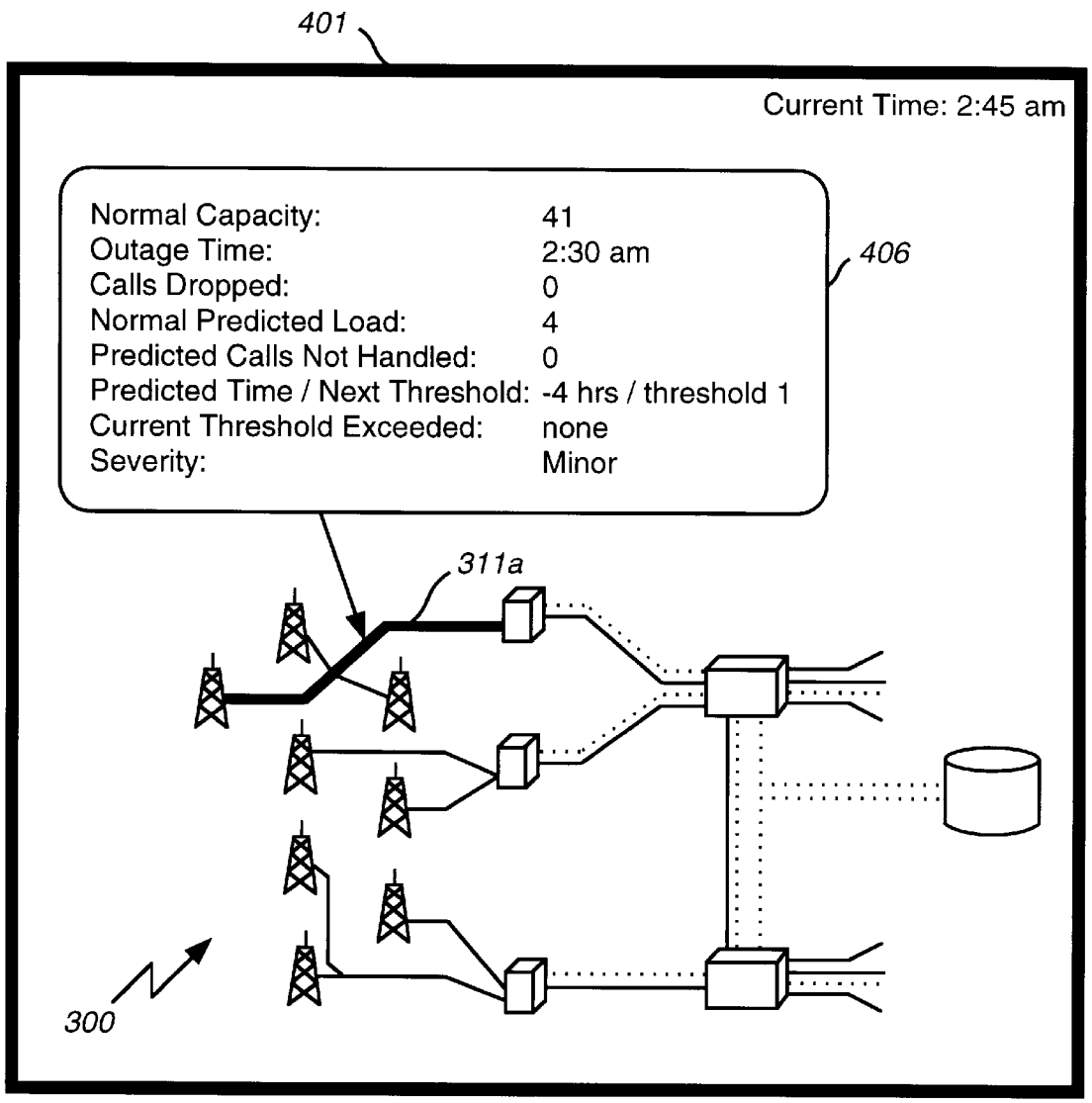

Examples of displays are illustrated in FIGS. 4A and 4B. In the example portrayed in FIGS. 4A and 4B, the fault caused trunk group 311a (described below with reference to FIG. 3) to be unavailable to telecommunications network 300 (described below). Note the display illustrates the effect of the fault on the telecommunications network 300 by a broad line representing the failed trunk group 311a. The inserts in FIGS. 4A and 4B represent two possible methods for representing service impact information to the user. FIG. 4A illustrates a graphical representation 404. FIG. 4B illustrates a textual representation 406. It would be apparent to one skilled in the art that FIGS. 4A and 4B are provided by way of illustration. That is, FIGS. 4A and 4B are not exhaustive of the ways the data can be displayed to a network operator or administrator, i.e., the end user. Using the displays, the user can easily view the service impact of the fault on the telecommunications network. Furthermore, the user can proceed to remedy the problem in an organized way by servicing the most critical faults first.

Another feature of the present invention is the ability to display potential service impact. In the preferred embodiment of the present invention, potential service impact is determined by analyzing historical and resource capacity data.

As described above, in addition to fault data, configuration and performance data are collected in step 102. Configuration and performance data are both described above. In step 104, the configuration and performance data is separated from the fault data.

In step 118, the method calculates resource capacity and historical data for service impact analysis (HDSIA). Resource capacity data refers to the capacity of the telecommunications system to service calls. Resource capacity is an indication of the network's current status. For example, resource capacity can indicate the effect of scheduled maintenance on the telecommunications system. Resource capacity can also provide an indication of outages in the telecommunications system as determined by the present invention's fault analysis described above. In the preferred embodiment of the present invention resource capacity does not occur in real time. This is primarily due to current system processing constraints. However, if system bandwidth permitted, resource capacity can be computed in real time. In the preferred embodiment of the present invention, resource capacity is calculated in hourly intervals.

HDSIA data captures resource capacity over a period of time. In the preferred embodiment of the present invention, for example, resource capacity for a week is averaged for each hourly increment. Mathematically, the function for generating HDSIA data is given by:

$$HDSLA(h) = \sum_{d=0}^{6} RCD(d, h), \quad \text{for } h = 0 \ldots 23 \tag{1}$$

where:

HDSIA is the historical data for service impact analysis,

RCD is the resource capacity data, h is the hour of day, and d is the day of week.

In the preferred embodiment of the present invention, HDSIA is calculated over a "rolling" window. A rolling window means that the HDSIA function is calculated over a window where the window steps by some increment. Thus, the HDSIA is, in effect, a moving average of resource capacity data. For example, in the preferred embodiment of the present invention, the window is a week long and the increment is a day. The "rolling" window of the present invention can operate with memory. That is, the HDSIA array is not cleared prior to calculating the next HDSIA. Alternatively, the HDSIA array can be cleared prior to calculating the next HDSIA. It would be apparent to any person skilled in the art that other functions for calculating the HDSIA can be implemented.

A user can perform a selection function regarding what data to use to calculate an HDSIA. For example, certain days (e.g., Mother's Day) can distort a true representation of normal activity because the telecommunication system is abnormally active or inactive on the particular day. Allowing such data into an HDSIA calculation can distort the sums in equation (1) above. As a result, the HDSIA can provide an inaccurate representation of the telecommunications system. In order to alleviate this problem, the present invention allows the user to choose to exclude a particular day or days from the HDSIA calculation. Alternatively, the user can build a special template whereby only a particular day or days are used to calculate the HDSIA.

After calculating resource capacity and HDSIA data, step 120 stores the data. Storage can be in a RAM, and/or in an external memory for archival purposes.

The method next moves to step 114, where potential service impact is determined. The determination is made based on the precalculated data stored in step 120. In the preferred embodiment of the present invention, potential service impact includes a prediction of the number of calls not handled, and the predicted time or level to the next threshold (described below).

The above described method can be applied to a telecommunications system as a whole or to various segments of the telecommunications system. By applying the method to the various segments of the telecommunications system a user (network administrator or operator) can compare the service impact of various telecommunications system outages to determine which is the most critical to restore. Due to limited resources, this triage feature of the present invention is of key importance.

Figure 2:
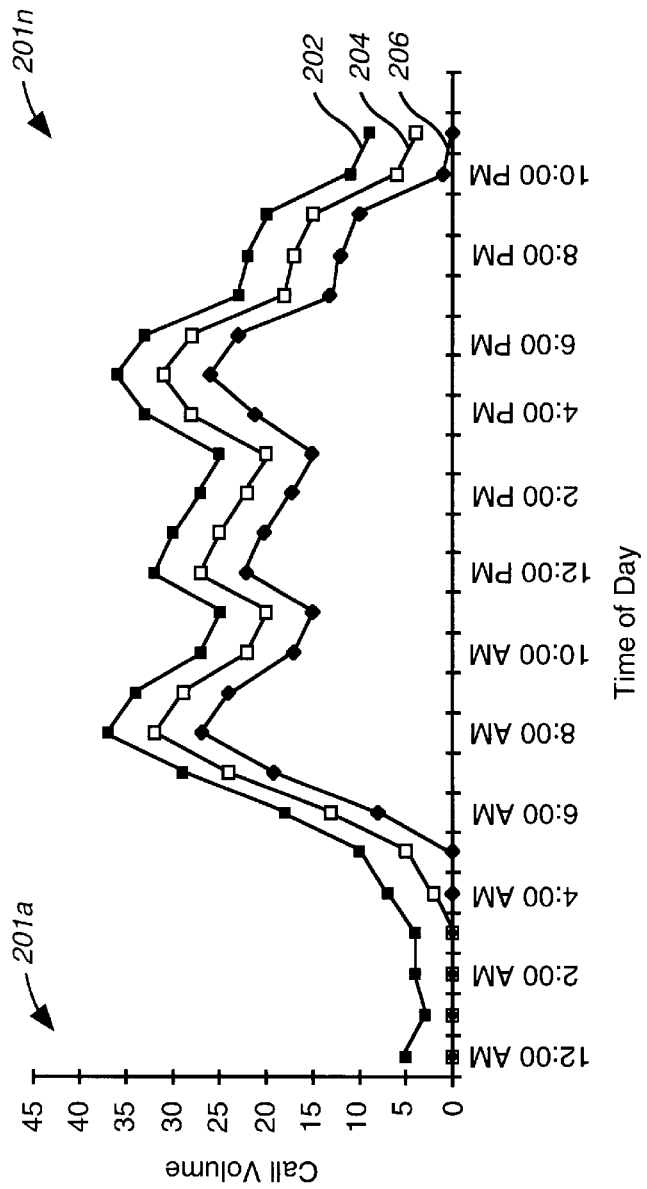
FIG. 2 is an example of historical data for service impact analysis.

FIG. 2 illustrates an example of plot of resource capacity and HDSIA. The calculated resource capacity is illustrated by the shaded bars 201a–n. As described above, resource capacity indicates the actual capacity of a particular segment of the telecommunications network at a particular time. For example, in the plot the resource capacity of the network at 12:00 AM is 41 calls. This is indicated by shaded bar 201a. At 8:00 AM, however, the resource capacity has dropped to 26 calls. Generally, a fault in the segment of the telecommunications system being monitored causes a drop in resource capacity. Note that at time 3:00 PM part of the system has been restored such that the system has resource capacity to handle 34 calls.

The HDSIA data is illustrated by curve 202. As described above, the HDSIA data 202 is a historical "rolling window" view of the resource capacity. Thus, at 12:00 AM, the telecommunications system historically expects to service 5 calls. Likewise, at 8:00 AM, the HDSIA data 202 indicates that the system expects to service 37 calls. Note that in the present case however, there is only resource capacity to handle 26 calls. Thus, of the 37 expected calls, 11 will not be serviced.

Curves 204 and 206 represent user (network administrator or operator) selectable thresholds. The thresholds determine points at which the severity levels change. Severity levels are described above. For example, curve 206 can be a nominal threshold. Curve 204 represents a more severe threshold. For example, when the resource capacity exceeds the threshold 206, the severity level changes to minor. This indicates that no calls are dropped or predicted to be dropped. If threshold 204 is exceeded, however, the severity level changes to major, indicating that calls are dropped or predicted to be dropped. By monitoring various network elements in this manner, a user can determine which network elements are in the most critical need of service. Due to the predictive nature of the information, the user can fix the problems before they happen, thereby minimizing service disruptions to customers.

Referring to FIG. 3, an example of the operation of the present invention is explained. FIG. 3 illustrates a typical wireless telecommunication network 300. The telecommunications network 300 includes cell sites 302a–h, cell site controllers 304a–c, mobile switches 306a–b, home location register 308, radio trunk groups 311a–o, and signaling links 312a–h.

A customer can communicate to the telecommunications network 300 via a mobile phone such as the mobile phones 310a–b. The communication path can be an air interface such as the air interfaces 314a–b. When a customer makes a call, a connection is formed between the customer's particular mobile phone 310a–b and a particular cell site 302a–h over a particular air interface 314a–b. Each cell site 302a–h includes a radio transmitter that determines a call coverage area for each cell site 302a–h. The call coverage area is the area in which a customer can access the telecommunications network 300 by a particular cell site 302a–h.

The call coverage area is determined by a cell site controller 304a–c. The cell site controllers 304a–c, in addition to determining coverage area, are responsible for monitoring each of their respective cell sites. For example, cell site controller 304a determines the coverage area of and monitors cell sites 302a–c. The cell site controllers 304a–c also calculate the resource capacity and HDSIA data for the network elements they control. For example, cell site controller 304a calculates resource capacity and HDSIA data for cell site 302a–c and trunk groups (described below) 311a–b.

The cell site controllers 304a–c are in turn controlled and monitored by a mobile switches 306a–b. Mobile switches 306a–b also provide communication paths to other networks. For example, mobile switch 306a can communicate with another telecommunications network over trunk groups 311j–l and signaling link 312g. The trunk groups 311a–o and signaling links 312a–h are described below. Mobile switches 306a–b can calculate resource capacity and HDSIA data for the cell site controllers they monitor.

The entire telecommunications network 300 is monitored and controlled by the home location register 308. Home location register 308 can determine the coverage area for each of the cell sites 302a–h, keep track of traffic in the telecommunications network 300, and maintain a record of the status of telecommunications network 300. The home location register 308 can calculate resource capacity and HDSIA data for the mobile switches that it controls. Thus, the present invention lends itself to a hierarchical calculation of resource capacity and HDSIA for the various level of the telecommunications system 300 hierarchy (discussed below).

Communication between the various network elements described above occurs over trunk groups 311a–o and signaling links 312a–h. Trunk groups 311a–o transmit call traffic between the various elements of the telecommunications network 300. Each trunk group 311a–o can transmit one or more calls over one or more trunk lines (not shown). The signaling links 312a–h transmit control and status information between the various network elements of telecommunications network 300. Control information includes cell site configuration such as coverage area. Status information includes alarm data as described above.

For purposes of this example, assume that trunk group 311a fails. The failure is determined by the monitoring function of cell site controller 304a via one or more alarms. Generally, the failure of a trunk group results in several hundred alarms. The resource capacity and HDSIA data is transmitted to home location register 308 through signaling links 312a and 312e. The home location register 308 then displays fault data and service impact data to a user (network administrator or operator).

Example displays are illustrated in FIGS. 4A and 4B. In the preferred embodiment of the present invention, the displays include a topological view of the network showing the failed trunk group 311a. In addition, the displays provide a user with a graphical 404 and/or textual format 406 of the resource capacity and HDSIA data. The resource capacity and HDSIA data corresponds to the telecommunications system 300 network segment that failed, trunk group 311a in this case. The displays can be generated for fixed and/or variable intervals. In the preferred embodiment of the present invention, displays of service impact are presented at fixed hourly intervals. In another embodiment, displays increase in frequency as the service impact increases in severity.

In Tables I–III, an example of a textual format 406 for displaying service impact is illustrated. Tables I–III demonstrate displaying the information at 2:30 am. Tables II and III illustrate the predictive capability of the present invention. That is, Tables II and III predict service impact at 7:00 am and 8:00 am, respectively. The predicted service impact is based on the actual fault, loss of trunk line 311a, that occurred at 2:30 am.

TABLE I

| 2:30 AM | |
|---|---|
| Actual Service Impact: | |
| Actual Dropped Calls: | 0 |
| Actual Blocked Calls: | 0 |
| Potential Service Impact: | |
| Resulting maximum capacity of resource: | 26 |
| Normal predicted load: | 4 |
| Prediction of calls not handled: | 0 |
| Predicted time/level to next threshold: | 4.5 hours until exceeding threshold 206 |
| Current threshold exceeded: | none |
| Severity: | minor (no calls blocked) |

TABLE II

| 7:00 AM | |
|---|---|
| Potential Service Impact: | |
| Resulting maximum capacity of resource: | 26 |
| Normal predicted load: | 29 |
| Prediction of calls not handled: | 3 |
| Predicted time/level to next threshold: | <1 hour until exceeding threshold 204 |
| Current threshold exceeded: | threshold 206 |
| Severity: | minor (no calls blocked) |

TABLE III

| 8:00 AM | |
|---|---|
| Potential Service Impact: | |
| Resulting maximum capacity of resource: | 26 |
| Normal predicted load: | 37 |
| Prediction of calls not handled: | 11 |
| Predicted time/level to next threshold: | <1 hour until decrease to threshold 204 |
| Current threshold exceeded: | threshold 204 |
| Severity: | major (calls blocked) |

In the preferred embodiment of the present invention, the displays are provided hourly until the fault is repaired and the faulty network segment is fully operational. It would be apparent to any person skilled in the art that the displays can be provided in other than 1 hour increments as the applications requires.

It would be apparent to one of ordinary skill in the art that other combinations of displays containing other representations of the data are possible within the scope and spirit of the present invention. In addition, other types of information conveyance are possible. For example, exceeding a given threshold can result in an alarm sounding or voice synthesized warning. Furthermore, to prevent clutter, the graphical and textual information boxes 404 and 406 could be pop-up windows. The pop-up windows are invoked by choosing the indicated faulty network segment from the topological display.

Although the resource capacity data and HDSIA data was described as being generated by the cell site controllers, it would be obvious to any person skilled in the art that the calculations could be performed at other levels in the telecommunications system 300 hierarchy. For example, alarm data could be transmitted by the cell site controller 304a to the home register 308 via signaling links 312a and 312e. In this case, the home location register 308 performs the calculations for resource capacity and HDSIA data.

Figure 5:
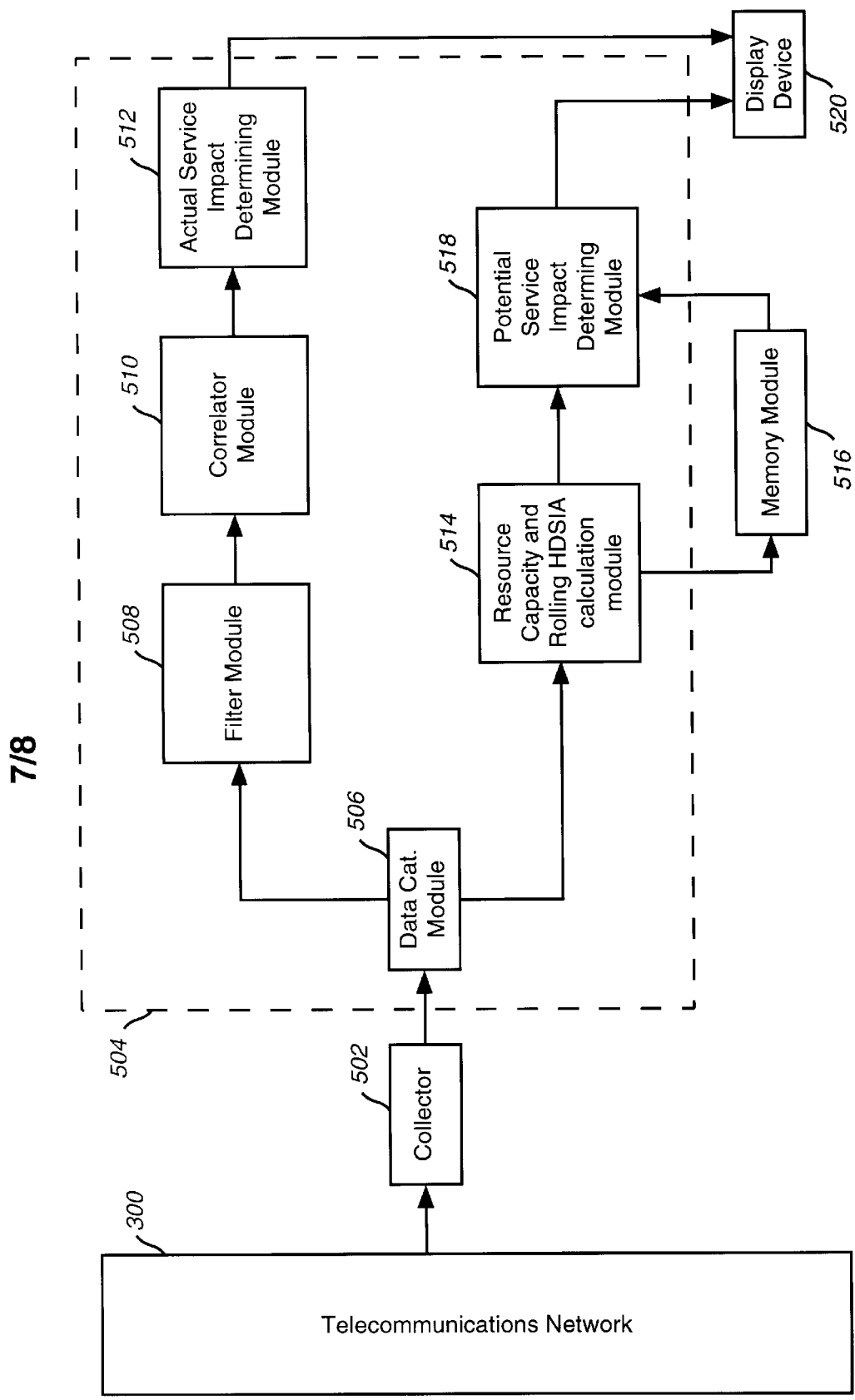
FIG. 5 is a system designed according to a preferred embodiment of the present invention.

Referring to FIG. 5, a system designed according to a preferred embodiment of the present invention is described. The system comprises a collector 502, a processor 504, a memory module 516, and a display device 520. Processor 504 comprises a data categorization module 506, a filter module 508, a correlator module 510, and actual service impact determining module 512, a resource capacity and rolling HDSIA calculation module 514, and a potential service impact determining module 518. The system is coupled to a telecommunications network 300.

The collector 502 is coupled to the telecommunications network 300 to collect status data from network equipment (not shown) comprising the network. The status data can be fault, configuration, or performance data, as described above. The collector transmits the status data to the data categorization module 506.

The data categorization module 506 separates the status data into fault data and performance and configuration data. It transmits the fault data to the filter module 508. It transmits the performance and configuration data to the resource capacity and rolling HDSIA calculation module 514.

The filter module 508 filters the fault data to reduce the volume of the fault data. As described above, the fault data can be filtered based on a variety of filter criteria. The filter transmits filtered data to the correlator module 510. The correlator module 510 correlates the data to further reduce the volume of the fault data. As described above the correlator module 510 possesses artificial intelligence, e.g., a rules based engine, for reducing the volume of the data. The correlator module 510 transmits the correlated data to the actual service impact module 512. The actual service impact module 512 determines the actual service impact to the network as indicated by the fault data that was collected by the collector 502. The actual service impact so determined is transmitted to the display device 520 for display.

The data categorization module 506 transmits performance and configuration data to the resource capacity and rolling HDSIA calculation module 514. The resource capacity and rolling HDSIA calculation module 514 uses the performance and configuration data to calculate the capacity of resources of the telecommunications network 501. The resource capacity and rolling HDSIA calculation module 514 also calculates the rolling HDSIA described above.

Because the resource capacity rolling HDSIA calculations are not required to be calculated in real time (although they could be), the result of the two calculations must be stored. The results of the two calculations are stored in memory module 516.

The potential service impact determining module 518 uses the results stored in memory module 516 to determine the potential service impact of the network given the calculated resource capacity and the demand prediction of the calculated HDSIA data. The potential service impact data is transmitted for display to the display device 520.

The display device 520 displays the data transmitted from the actual service impact determination module 512 and the potential service impact determination module 518. FIGS. 4A and 4B provide examples of the displays that can be generated from the data as described above. Once again it would be apparent to any person skilled in the art that FIGS. 4A and 4B are merely illustrative, and not exhaustive, of the types of displays that can be generated from the actual and potential service impact data.

Figure 6:
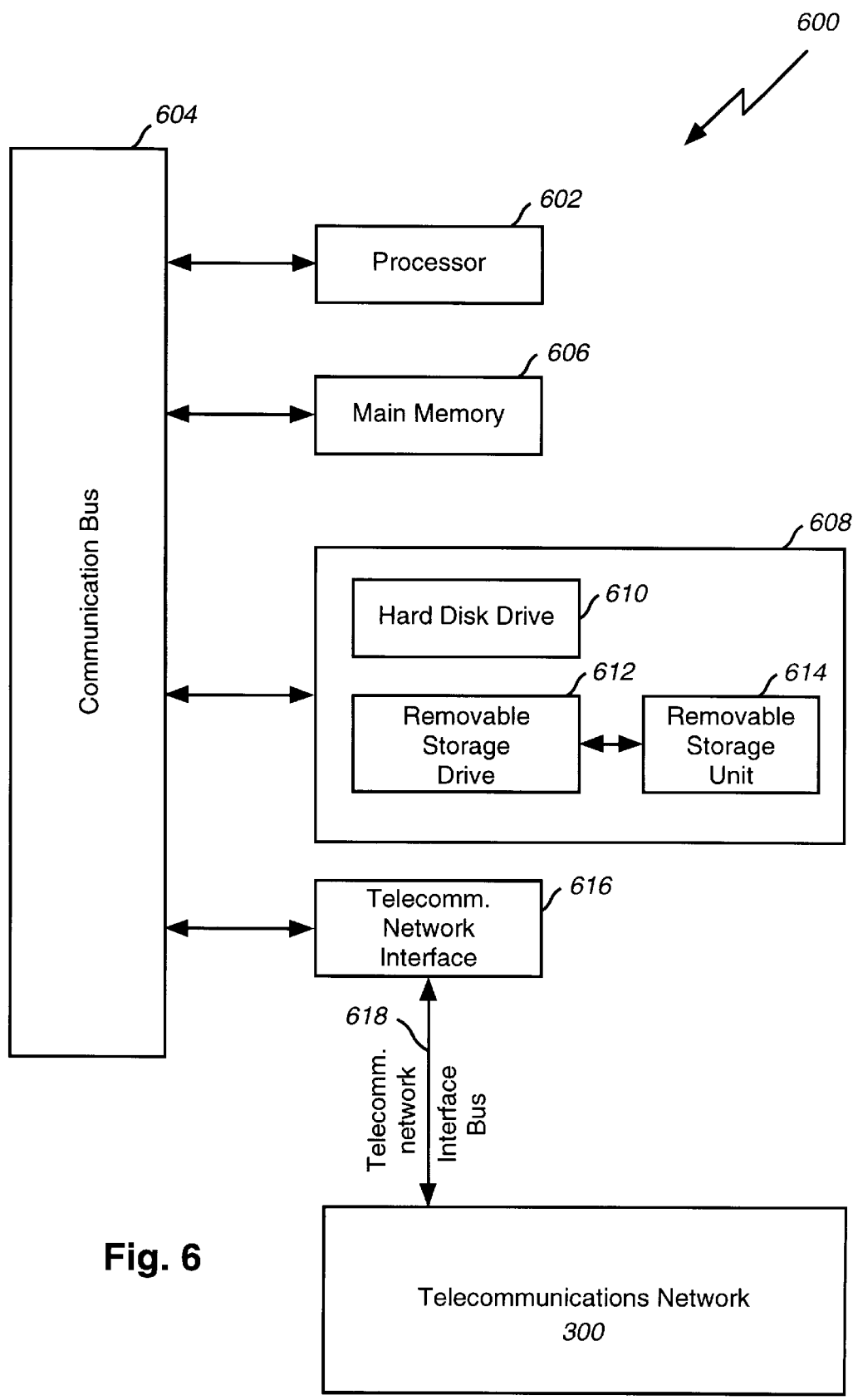
FIG. 6 is a computer system operating according to a preferred embodiment of the present invention.

In one embodiment, the invention is directed a computer system operating as discussed herein. An exemplary computer system 600 is shown in FIG. 6. The computer system 600 includes one or more processors, such as processor 602. The processor is connected to a communication bus 604. The communication bus 604.

The computer system 600 also includes a main memory 606, preferably random access memory (RAM), and a secondary memory 608. The secondary memory 608 includes, for example, a hard disk drive 610 and/or removable storage drive 612, representing a floppy disk drive, magnetic tape drive, a compact disk, etc. The removable storage drive 612 reads from and/or writes to a removable storage unit 614 in a well known manner.

Removable storage unit 614, also called a program storage device or a computer program product, represents a floppy disk, magnetic tape, compact disk, etc. As will be appreciated by any person skilled in the art to which the present invention pertains, the removable storage unit 614, includes a computer useable storage medium having stored therein computer software and/or data.

The computer system 600 also includes a telecommunications network interface 616. The telecommunications network interface 616 is coupled to the communication bus 604 and to a telecommunications network interface bus 618. The computer system 600 can input status data from the telecommunications network 300 over the telecommunications network interface bus 618.

Computer programs (also called computer control logic) are stored in main memory and/or the secondary memory 608. Such computer programs, when executed, enable the computer system 600 to perform the features of the present invention as discussed herein. In particular, the computer programs, when executed, enable the processor 602 to perform the features of the present invention. Accordingly, such computer programs represent controllers of the computer system 600.

In another embodiment, the present invention is directed to a computer program product comprising a computer readable medium having control logic (computer software) stored therein. The control logic, when executed by the processor 602, causes the processor 602 to perform the functions of the invention as described herein.

In another embodiment, the present invention is implemented primarily in hardware using, for example, a hardware state machine. Implementation of the hardware state machine so as to perform the functions described herein will be apparent to persons skilled in the art to which the present invention pertains.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for analyzing a service impact of a fault in a wireless network containing network equipment, comprising the steps of:

(a) collecting fault data generated in response to the fault from the network equipment;

(b) filtering said fault data to reduce the volume of said fault data;

(c) correlating said filtered fault data to determine the fault;

(d) determining actual service impact data based on said correlated fault data;

(e) displaying said fault data and said actual service impact data to a user;

(f) collecting configuration data from the network equipment;

(g) calculating resource capacity data;

(h) calculating a rolling history data service impact analysis (HDSIA) data, wherein said HDSIA data is calculated over a rolling window of time, and wherein said rolling window of time is moved in time by an increment;

(i) storing said resource capacity data and said HDSIA data as stored data; and (j) determining a potential service impact based on said stored data.

2. The method of claim 1, wherein steps (a)–(e) and (j) are performed in substantially real-time.

3. The method of claim 1, wherein step (a) is performed substantially simultaneously with step (f).

4. The method of claim 1, wherein a user arbitrarily prevents a particular period from being incorporated into said configuration data.

5. The method of claim 1, wherein step (e) further comprises the step of textually representing said fault data.

6. The method of claim 1, wherein step (e) further comprises the step of pictorially representing said fault data.

7. The method of claim 1, wherein step (c) is a rules-based correlation.

8. The method of claim 7, wherein said rules-based correlation associates a fault with a particular grouping of equipment.

9. The method of claim 7, wherein said rules-based correlation associates a fault with a particular sequence of faults over time.

10. The method of claim 1, wherein the correlating step (c) is "hardcoded" in software such that a particular grouping of said fault data is associated with a particular fault.

11. A system for analyzing a service impact of a fault in a wireless network, comprising:

network equipment;

a collector coupled to said network equipment for collecting fault data from said network equipment;

a filter coupled to said collector for reducing the volume of said fault data;

a correlator coupled to an output of said filter for correlating further reducing the volume of data output by said filter;

a processor coupled to said correlator for determining actual service impact based on data output by said correlator; and a display device coupled to said processor for displaying said fault data and said actual service impact data to a user, wherein said collector collects configuration and performance data, wherein said processor calculates resource capacity data and history data for service impact analysis (HDSIA) based on said configuration and performance data, wherein said HDSIA is calculated over a rolling window of time, wherein said rolling window of time is moved in time by an increment, and wherein said processor determines potential service impact based on said resource capacity data and said HDSIA data to be displayed on said display device.

12. A method for analyzing a service impact of a fault in a communications network containing network equipment, comprising the steps of:

(a) collecting fault data generated in response to said fault from the network equipment;

(b) filtering said fault data to reduce the volume of said fault data;

(c) correlating said filtered fault data to determine said fault;

(d) determining actual service impact data based on said correlated fault data;

(e) displaying said fault data and said actual service impact data to a user;

(f) collecting configuration data from the network equipment;

(g) calculating resource capacity data;

(h) calculating a rolling history data service impact analysis (HDSIA) data, wherein said HDSIA data is calculated over a rolling window of time, and wherein said rolling window of time is moved in time by an increment;

(i) storing said resource capacity data and said HDSIA data as stored data; and (j) determining a potential service impact based on said stored data.

13. The method of claim 12, wherein a user arbitrarily prevents a particular period from being incorporated into said configuration data.

14. The method of claim 12, wherein step (c) is a rules-based correlation and wherein the rules-based correlation associates a fault with a particular grouping of equipment.

15. The method of claim 12, wherein step (c) is a rules-based correlation and wherein the rules-based correlation associates a fault with a particular sequence of faults over time.

* * * * *